US011620442B2

(12) United States Patent
Luo

(10) Patent No.: US 11,620,442 B2
(45) Date of Patent: Apr. 4, 2023

(54) INTERPRETATION RISK DETECTION

(71) Applicant: Citrix Systems, Inc., Fort Lauderdale, FL (US)

(72) Inventor: Haipeng Luo, Nanjing (CN)

( * ) Notice: Subject to any disclaimer, the term of this patent is extended or adjusted under 35 U.S.C. 154(b) by 0 days.

(21) Appl. No.: 17/344,467

(22) Filed: Jun. 10, 2021

(65) Prior Publication Data
US 2022/0391579 A1 Dec. 8, 2022

Related U.S. Application Data

(63) Continuation of application No. PCT/CN2021/098262, filed on Jun. 4, 2021.

(51) Int. Cl.
*G06F 17/00* (2019.01)
*G06F 40/169* (2020.01)
*G06F 40/20* (2020.01)

(52) U.S. Cl.
CPC ............ *G06F 40/169* (2020.01); *G06F 40/20* (2020.01)

(58) Field of Classification Search
CPC .................................. G06F 40/169; G06F 40/20
See application file for complete search history.

(56) References Cited

U.S. PATENT DOCUMENTS

| | | | | |
|---|---|---|---|---|
| 5,917,484 A * | 6/1999 | Mullaney | ................ | G06F 9/454 704/8 |
| 6,754,694 B1 * | 6/2004 | Hiura | .................... | H04L 51/066 704/7 |
| 7,810,031 B2 * | 10/2010 | Coleman | ............... | G06Q 10/107 715/255 |
| 8,024,411 B2 * | 9/2011 | Pulfer | .................. | G06Q 10/107 707/769 |
| 9,460,082 B2 * | 10/2016 | O'Sullivan | ........... | H04L 51/063 |
| 2002/0065875 A1 * | 5/2002 | Bracewell | ............. | H04L 67/306 709/213 |
| 2003/0212527 A1 * | 11/2003 | Moore | .................. | G06F 40/169 702/179 |
| 2004/0117501 A1 | 6/2004 | Day et al. | | |
| 2005/0114768 A1 | 5/2005 | Atkin et al. | | |
| 2005/0228641 A1 * | 10/2005 | Chelba | .................... | G06F 40/20 704/9 |
| 2006/0010379 A1 * | 1/2006 | Kashi | .................... | H04M 7/003 715/764 |

(Continued)

FOREIGN PATENT DOCUMENTS

CN 13992084 A 2/2003
CN 107562733 A 1/2018

OTHER PUBLICATIONS

International Search Report and Written Opinion dated Feb. 24, 2022 for PCT/CN2021/098262 filed Jun. 4, 2021; pp. 9.

*Primary Examiner* — Mohammed H Zuberi

(57) ABSTRACT

A system and method for detecting global interpretation risks in an email. A method includes extracting data from a header of an email, the data indicative of a locale of a sender; comparing the extracted data to other data indicative of a locale of a recipient of the email; and in response to a mismatch between the locales of the sender and recipient: scanning content of the email to identify portions of content subject to misinterpretation by the recipient, and modifying display of the email in response to an identification of at least one portion of content subject to misinterpretation, the modifying to indicate possible misinterpretation of the content by the recipient.

18 Claims, 9 Drawing Sheets

(56) References Cited

U.S. PATENT DOCUMENTS

| | | | |
|---|---|---|---|
| 2006/0075035 A1* | 4/2006 | Tripp | G06Q 10/107 709/206 |
| 2007/0174398 A1* | 7/2007 | Addante | H04L 51/18 709/206 |
| 2009/0055487 A1* | 2/2009 | Moraes | G06Q 10/109 709/206 |
| 2010/0146058 A1* | 6/2010 | Naef | G06Q 10/109 709/206 |
| 2013/0060863 A1* | 3/2013 | D'Eri | H04L 51/212 709/206 |
| 2014/0245383 A1* | 8/2014 | Singhal | H04W 12/06 726/2 |
| 2017/0061956 A1* | 3/2017 | Sarikaya | G06N 20/20 |
| 2017/0177566 A1* | 6/2017 | Huck | G06F 40/284 |
| 2017/0249291 A1* | 8/2017 | Patel | H04L 51/063 |

\* cited by examiner

INTERPRETATION RISK DETECTION

BACKGROUND OF THE DISCLOSURE

Email allows users around the world to easily communicate with a uniform technology in a common language, such as English. As such, businesses and other global enterprises rely heavily on email to exchange important information.

BRIEF DESCRIPTION OF THE DISCLOSURE

Aspects of this disclosure provide a system, method and program product for detecting global interpretation risks among email users, and notifying users of such risks.

A first aspect of the disclosure provides a system that includes a memory and a processor coupled to the memory and configured to detect interpretation risks in an email application. Detecting interpretation risks include: extracting data from a header of an email, the data indicative of a locale of a sender of the email and comparing the extracted data to other data indicative of a locale of a recipient of the email. In response to a mismatch between the locales of the sender and recipient: scanning content of the email to identify portions of content that is subject to misinterpretation by the recipient, and modifying display of the email in response to an identification of at least one portion of content subject to misinterpretation, the modifying to indicate possible misinterpretation of the content by the recipient.

A second aspect of the disclosure provides a computerized method that detects globalization interpretation risks in an email application. The method includes extracting data from a header of an email, the data indicative of a locale of a sender and comparing the extracted data to other data indicative of a locale of a recipient of the email. In response to a mismatch between the locales of the sender and recipient: scanning content of the email to identify portions of content subject to misinterpretation by the recipient, and modifying display of the email in response to an identification of at least one portion of content subject to misinterpretation, the modifying to indicate possible misinterpretation of the content by the recipient.

A third aspect discloses a program product stored on a computer readable medium, which when executed by a computer processor on a client device, provides an email client. The computer program product includes program code that loads a user locale into the email client from a client device when the email client is launched. Also included is program code that inserts the user locale as a sender locale into a header of an email being sent to a recipient. Further included is program code that extracts the sender locale from the header in a received email and compares the sender locale with the user locale, and program code that, in response to a mismatch between the sender locale and the user locale, scans content in the email for interpretation risks and displays the received email with a modification in response to a detection of at least one interpretation risk.

The illustrative aspects of the present disclosure are designed to solve the problems herein described and/or other problems not discussed.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which.

Figure 1:
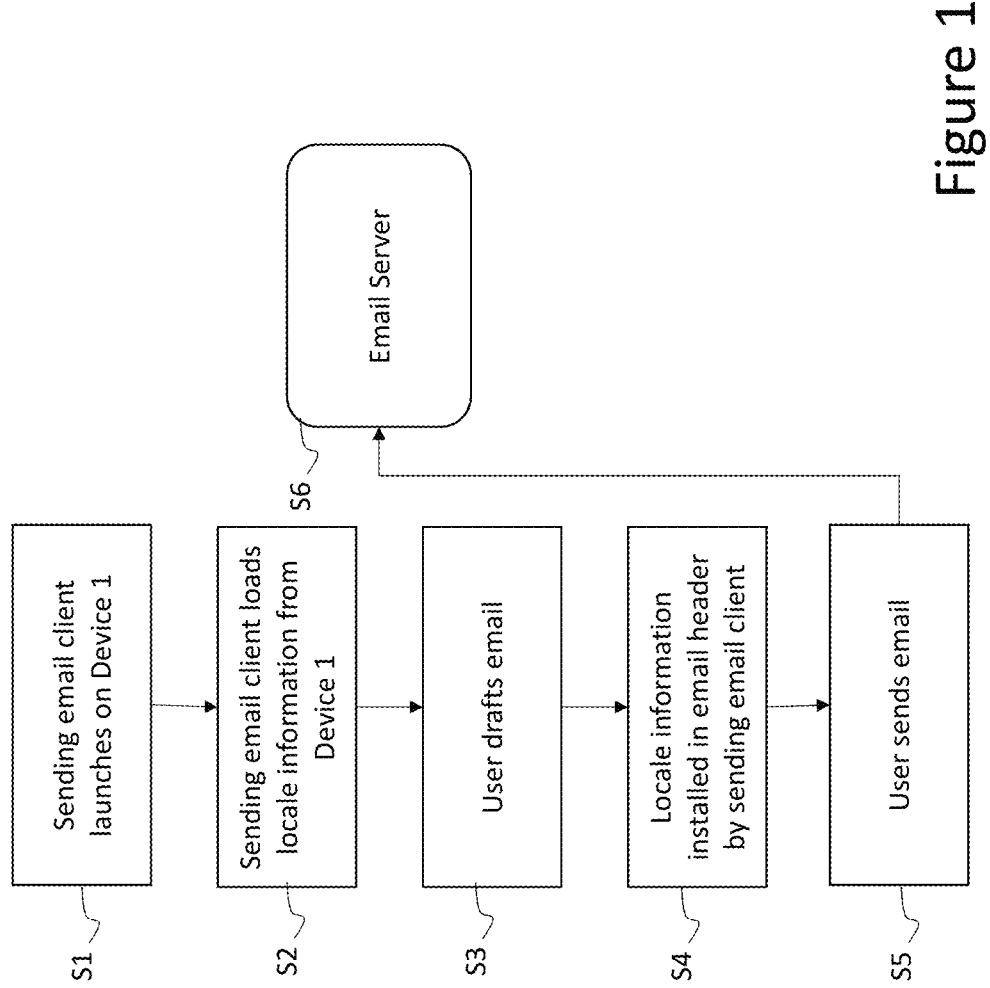
FIG. 1 depicts a flow diagram of a process for generating an email, in accordance with an illustrative embodiment.

The drawings are intended to depict only typical aspects of the disclosure, and therefore should not be considered as limiting the scope of the disclosure.

DETAILED DESCRIPTION OF THE DISCLOSURE

Users of Email and other electronic communication systems must be sensitive to the fact that certain terms have different interpretations depending on the culture and geographic location of the sender and recipient. Embodiments of the disclosure include technical solutions for detecting global interpretation risks among email and other electronic communication system users and providing notifications when risks are detected. Global interpretation risks generally include electronic communications (e.g., email, messaging, collaboration systems, etc.) delivered to a recipient client having content that is "subject to misinterpretation" by the recipient. Misinterpretation of content by the recipient can be a result from cultural language differences between the sender and the recipient. Examples of such global interpretation risks may include differences in the manner information is formatted, e.g., dates (e.g., 10/05/2021 versus 05/10/2021), numbers (e.g., 5.000 can mean both five thousand and five), currency (e.g., 25,00 can mean the same 25.00 or be a typo), time formats (e.g., 3:30 versus 15:30), etc. Other risks may include words or phrases that having different meanings around the world, e.g., the word "ton," may refer to a US ton or a metric ton, etc.

Aspects of the present disclosure address such interpretation risks in electronic communication systems by comparing a locale of the sender with a locale of the recipient. In computing technologies, a locale is a set of parameters that, e.g., defines a user's language, region and any special variant preferences. Typically, an identifier of a locale includes at least one of a language code or a country/region (i.e., area) code, and is stored in memory on a client device, such as a smart phone. For example, the locale en_CA specifies English as the language and Canada as the area/country, and fr_CA specifies French as the language and Canada as the area/country. In various embodiments, identifiers indicative of locales may be defined by standards such as ISO/IEC 15897, LCID, BCP 47, etc., and locales may be readily referenced/obtained in Java programming using the Locale Class with a constructor such as Locale (String Language, String Country, String variant).

In one illustrative embodiment, locales of the sender and recipient are compared by the recipient's client when the recipient receives an electronic communication (e.g., an email). In one such an embodiment, the locale of the sender is embedded in the email message and then extracted when the email is received or accessed by the recipient. The locale of the sender can be provided or otherwise indicated by metadata of an electronic communication. One approach to provide metadata indicative of locale within an electronic communication is to embed the locale within a header, payload or body of that communication (e.g., to store the locale in a custom email header). ARPA Internet message standard RFC 822 provides the ability to add such a custom header prefixed with "x-". Thus, e.g., a header named "x-locale" can be used to store the sender's locale, e.g., x-locale="fr_CA". When a recipient email client receives an electronic communication (e.g., an email) containing an x-locale header, the recipient client extracts the sender's locale from the header and compares its locale with the sender's locale. If the locales do not match, the content of the communication is then scanned for global interpretation risks. If a risk is detected, the communication can be modified (e.g., with a notification or changes/additions made to the content of the communication).

Figure 2:
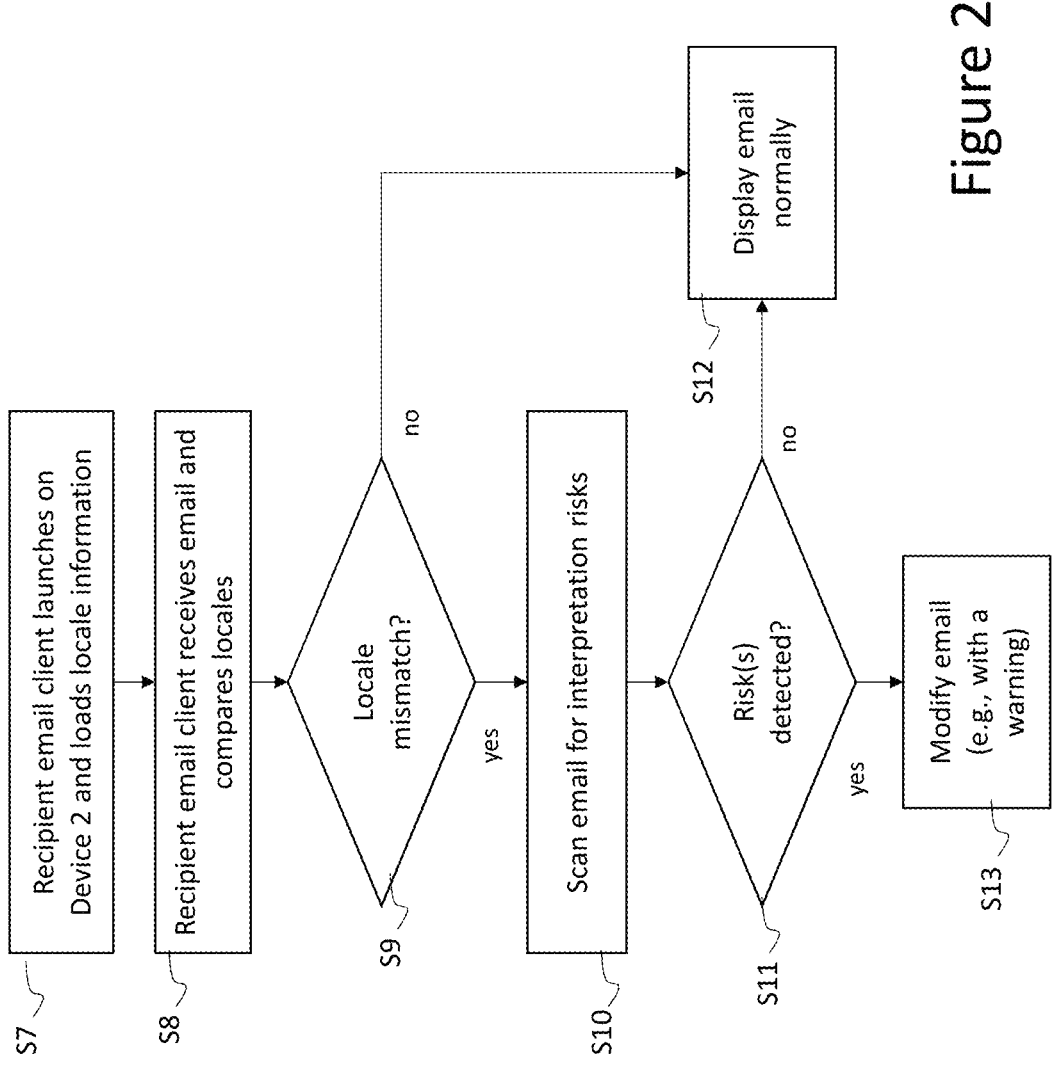
FIG. 2 depicts a flow diagram of a process for receiving an email and detecting interpretation risks in an email platform, in accordance with an illustrative embodiment.

FIGS. 1 and 2 depicts an illustrative process for detecting interpretation risks according to embodiments. At S1, a sending email client is launched on a client device (Device 1) which causes the locale stored in the client device to be loaded into the sending email client at S2 (and stored so long as the email client is active). Locale information is typically stored on a device during set-up, e.g., when a user initially configures a new smart device, laptop, etc. In other approaches, the locale can be obtained for some alternate source other than the client device, e.g., a cache, a remote system, hard-coded into the client, a server, etc. Next, at S3, the user (i.e., sender in this case) of Device 1 drafts an email within the email client and at S4 the locale information of the user is installed into the email header by the sending email client. As noted, the special headers afforded under ARPA Internet message standard RFC 822 provide a unique solution for storing the locale of the sender in an email message. However, in alternative approaches, the locale could be incorporated into some other form of payload within the email (e.g., the message body, the subject, etc.). At S5, the user sends the email, which is then forwarded via an email server at S6.

Referring now to FIG. 2, an illustrative process for receiving and processing an email containing locale information is provided. At S7, the recipient email client at some point prior to receiving the email launches on Device 2 and loads its locale (in this example, the locale of the recipient). In an alternative approach, the locale of the recipient could be obtained from some other source, e.g., a cache, a remote system, hard-coded into the client, a server, etc. Regardless, at S8, the recipient email client receives the email from the sender, and compares the locales of the sender and recipient. At S9, a determination is made whether there is a mismatch between the locales. If there is no mismatch, then the email is displayed normally at S12. If the locales are mismatched at S9, the email is scanned for interpretation risks at S10. If no risk is detected at S11, then the email is displayed normally at S12. If a risk is detected at S11, then the email is modified, e.g., with a warning.

Figure 3:
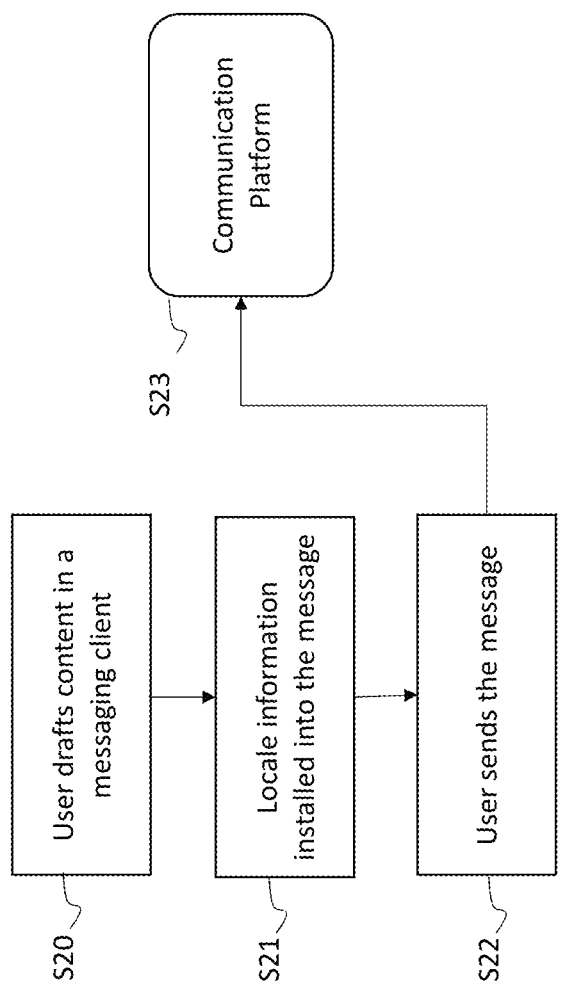
FIG. 3 depicts a flow diagram of a process for generating a message in an electronic communications system, in accordance with an illustrative embodiment.
Figure 4:
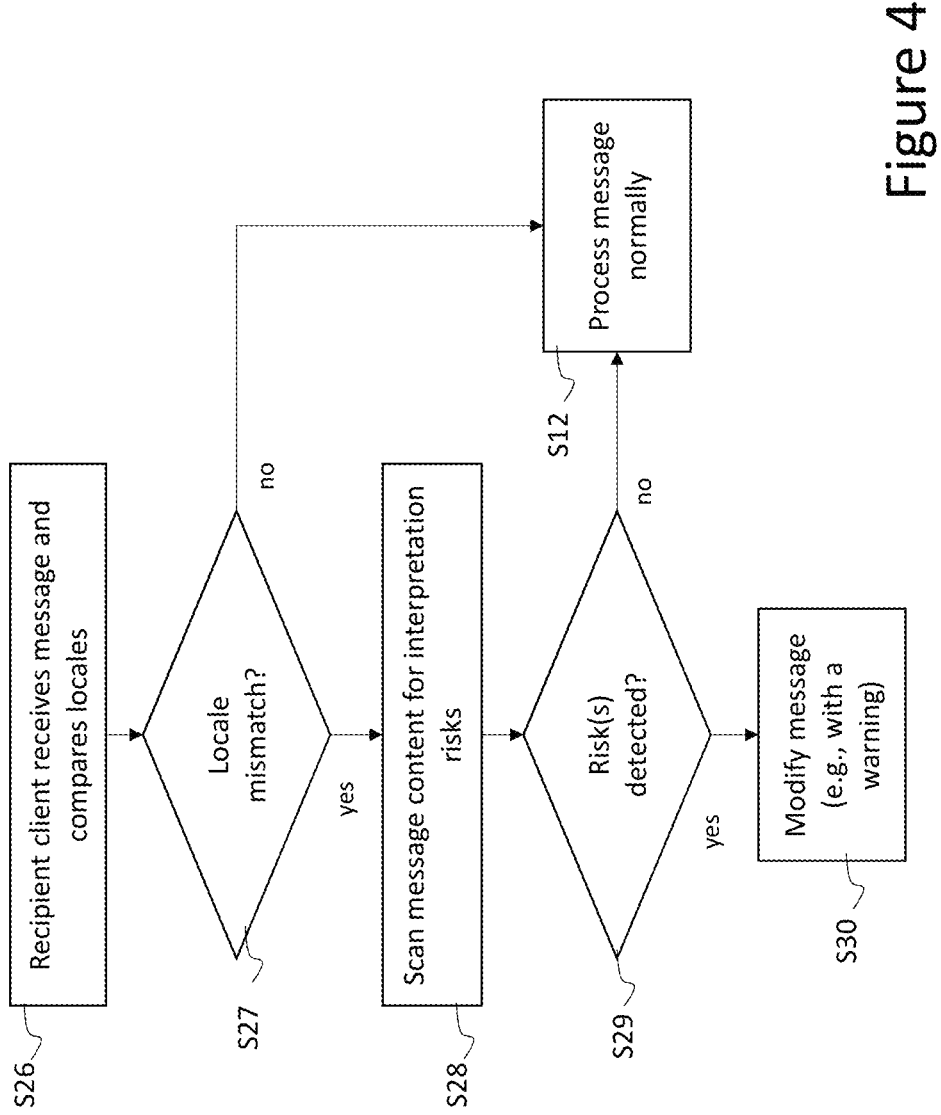
FIG. 4 depicts a flow diagram of a process for receiving a message and detecting interpretation risks in an electronic communications system, in accordance with an illustrative embodiment.

FIGS. 3 and 4 depict an alternative embodiment relating to use of a communication platform that exchanges electronic messages between a client on a first device and a client on a second device (e.g., a messaging system, text messaging, a collaboration system, etc.). At S20, a user drafts or otherwise provides content in a messaging client that creates a message. At S21, locale information of the user is installed into the message. The locale information can be incorporated into a header (as described herein), some part of the messaging payload, the message itself, etc. At S22 the user sends the message via a communication platform S23.

As shown in FIG. 4, a recipient client receives the message and compares the sender locale with the recipient locale. At S27, a determination is made whether a locale mismatch exists, and if no, the message is processed normally, e.g., displayed with no changes, stored, relayed, etc. If a mismatch is detected at S27, then the message content is scanned at S28 for interpretation risks. If no risk is detected at S29, then the message is processed normally. If a risk is detected at S29, then the message is modified, e.g., with a warning.

Figure 5:
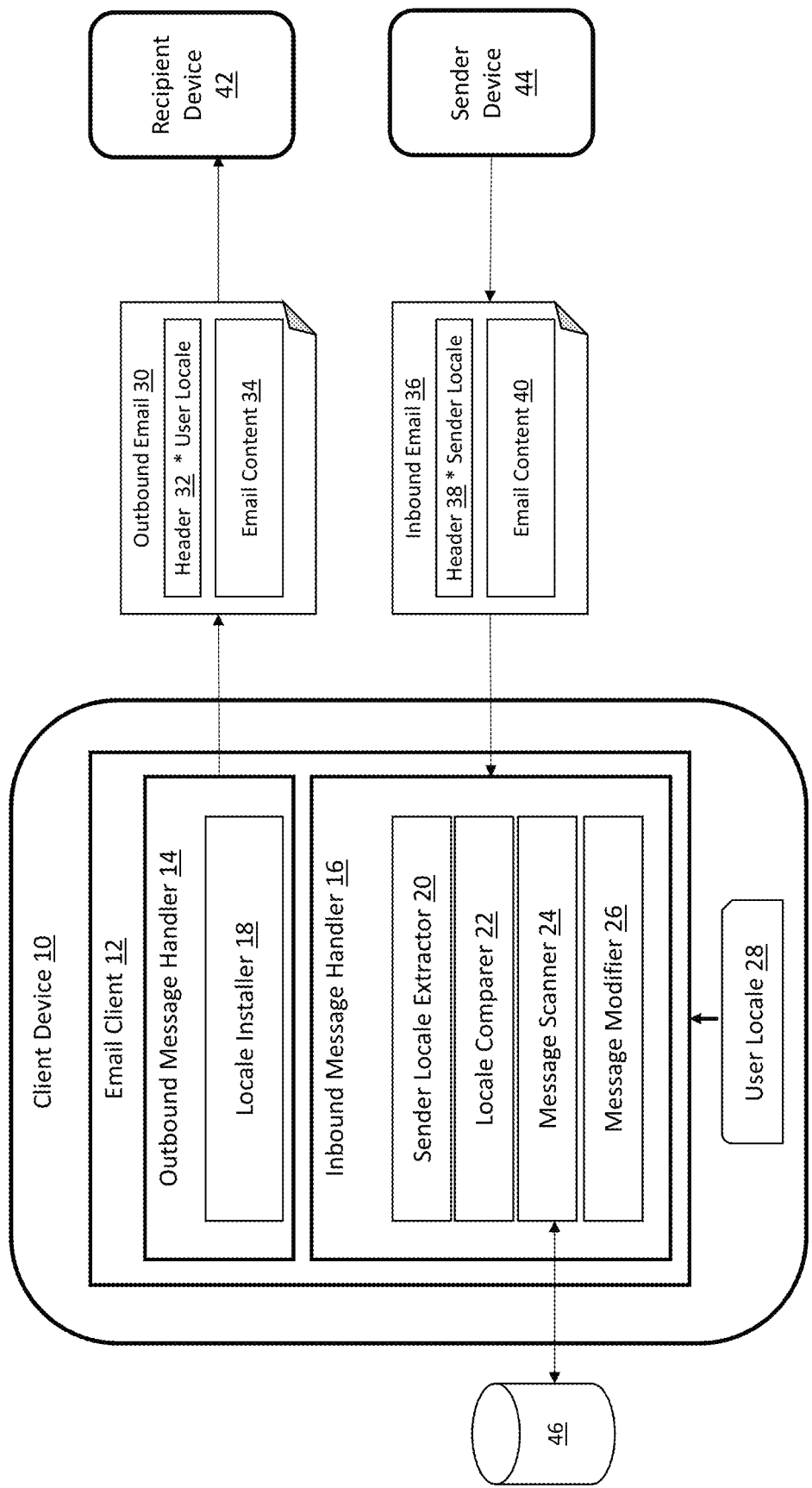
FIG. 5 depicts a client device having an email client configured to detect interpretation risks in email messages, in accordance with an illustrative embodiment.

FIG. 5 depicts an example of a client device 10 having an email client 12 configured for facilitating interpretation risk detection. Client device 10 may comprise any type of computing device, e.g., a desktop, laptop, smartphone, etc., capable of executing the email client 12. Email client 12 may include any type of mail user agent, i.e., a computer program to access and manage a user's email. As shown, email client 12 includes an outbound message handler 14 that manages outbound messages (i.e., when the user is the sender) and an inbound message handler 16 that manages inbound messages (i.e., when the user is the recipient). Also stored in memory on client device 10 is the user locale 28, which may for example be stored when the user first configures device 10. As noted, the user locale 28 may be loaded into the email client 12 when the client 12 launches, i.e., is activated and run on the client device 10. Alternatively, the user locale 28 may be retrieved as needed by the email client 12 from device 10.

In one embodiment, email client 12 may be implemented as part of secure enterprise email platform such Secure Mail provided by CITRIX Systems, Inc. of Fort Lauderdale, Fla. In such a case, individual email clients 12 can be configured with a common scheme to obtain and process locales to identify interpretation risks. In other cases, the email client 12 could simply operate in an open email environment such as Microsoft Exchange Server/Outlook or Google Gmail. In the latter case, locale processing could only occur when both the sender and recipient are equipped to do so, e.g., by activating or installing an agent to perform the functions described herein.

When creating and sending an outbound email 30, locale installer 18 installs the user locale (i.e., the sender locale) into a body, payload or header 32 along with the email content 34, which is then sent to the recipient device 42. When the user of the recipient device 42 receives the outbound email, the recipient device 42 can compare locales and detect interpretation risks.

When receiving an inbound email 36 from a sender device 44, sender locale extractor 20 extracts the sender locale from the header 38 in the inbound email 36. Locale comparer 22 then compares the sender locale with the user locale 28 (in this case the recipient locale). If the sender and recipient locales do not match, message scanner 24 scans or otherwise checks the email content 40 for interpretation risks. In one embodiment, a collection of known interpretation risks may be stored in a database 46 that is accessible by the message scanner 24 to compare and identify risks. For example, known interpretation risks may include a formatted string such as a date string //20**, in which * can be any numeral. Other formatted strings may include number strings such as %.% or %,% in which % can be any whole number. Other known interpretation risks stored in database 46 may simply include a list of words of phrases, e.g., ton, tonne, etc. Message scanner 24 may for example examine individual strings in the email content 40 and search database 46 for matching strings. If a string is matched, the string in the email content is flagged as an interpretation risk. In addition to operating on strings, message scanner 24 can also be configured to process other types of content, such as images, emoji's, attachments, audio/visual content, etc.

Database 46 may include any system, data structure, object, file, etc., that can reside on the client device 10 or remotely, e.g., on a server, and be updated or modified in any manner, e.g., by an administrator, via a machine learning tool, etc. Known interpretation risks can also be categorized, ranked, rated, prioritized, etc., in any manner, in database 46. In certain embodiments, a level or severity of known interpretation risks may be included in the database 46. Furthermore, known interpretation risks may be associated with specific locale mismatches, e.g., a certain risk may be flagged between locale A and locale B, but not between locale A and locale C. Thus, message scanner 24 may consider the particular locales of sender and recipient (not just a mismatch) in determining whether a portion of the email content is subject to misinterpretation.

In the event at least one interpretation risk is identified in the email content 40, message modifier 26 modifies the email message to bring attention of the risk to the recipient. Any type of modification may be made. For instance, portions of the content may be altered using, e.g., highlighting, colorizing, marking, underlining, annotating, etc. In other cases, warnings or pop-up windows could be generated by the recipient email client. In still other cases, an audio queue may be played. In certain embodiments, the type of modification may be based on the level or severity of the detected risk, e.g., a low level severity may result in a notice in the email whereas a high level severity may result in a pop-up window.

Figure 6:
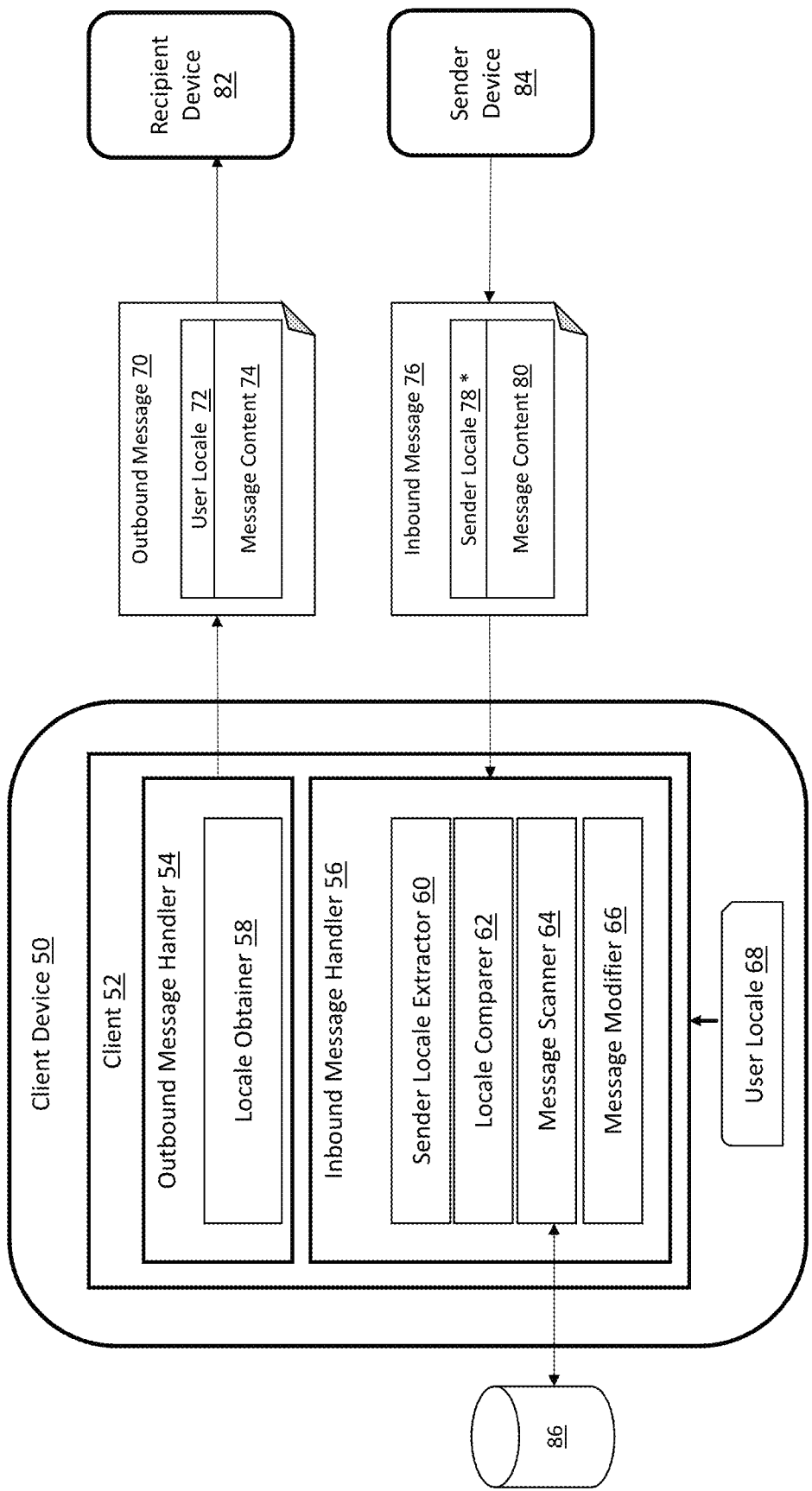
FIG. 6 depicts a client device having messaging client configured to detect interpretation risks in messages, in accordance with an illustrative embodiment.

FIG. 6 depicts an alternative example of a generalized client device 50 having a client 52 configured for facilitating interpretation risk detection when processing electronic messages. Client device 50 may comprise any type of computing device, e.g., a desktop, laptop, smartphone, etc., capable of executing the client 52. Client 52 may include any type of communication-based user agent, i.e., a computer program to access and manage a user's messages. As shown, client 52 includes an outbound message handler 54 that manages outbound messages (i.e., when the user is the sender) and an inbound message handler 56 that manages inbound messages (i.e., when the user is the recipient). Also stored in memory on client device 50 is the user locale 68, which may for example be stored when the user first configures device 50. The user locale 68 may be loaded into the client 52 when the client 52 launches, i.e., is activated and run on the client device 50. Alternatively, the user locale 68 may be retrieved as needed by the client 52 from device 50.

When creating and sending an outbound message 70, locale obtainer 58 obtains and installs the user locale (i.e., the sender locale) 72 into the message, e.g., as part of the body, payload, header, etc. along with the message content 74, which is then sent to the recipient device 82. When the user of the recipient device 82 receives the outbound message 70, the recipient device 82 can compare locales and detect interpretation risks.

When receiving an inbound message 76 from a sender device 84, sender locale extractor 60 extracts the sender locale from the inbound message 76. Locale comparer 62 then compares the sender locale with the user locale 28 (in this case the recipient locale). If the sender and recipient locales do not match, message scanner 24 scans or otherwise checks the message content 80 for interpretation risks. In one embodiment, a collection of known interpretation risks may be stored in a database 86 that is accessible by the message scanner 24 to compare and identify risks in a manner described herein.

In the event at least one interpretation risk is identified in the message content 80, message modifier 66 modifies the message to bring attention of the risk to the recipient. Any type of modification may be made. For instance, portions of the content may be altered using, e.g., highlighting, colorizing, marking, underlining, annotating, etc. In other cases, warnings or pop-up windows could be generated by the recipient email client. In still other cases, an audio queue may be played. In certain embodiments, the type of modification may be based on the level or severity of the detected risk, e.g., a low level severity may result in a notice in the email whereas a high level severity may result in a pop-up window.

Figure 7:
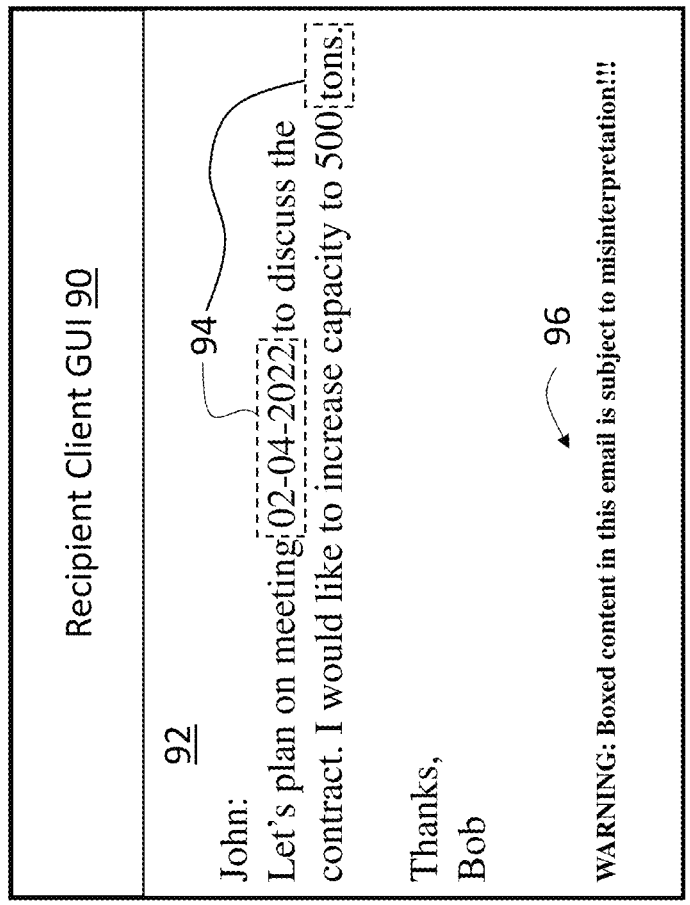
FIG. 7 depicts a graphical user interface (GUI) showing detected interpretation risk, in accordance with illustrative embodiments.

FIG. 7 depicts an illustrative recipient client graphical user interface (GUI) 90. In this example, displayed content 92 includes two instances of detected interpretation risks 94, as well as a warning 96. In this case, the date "02-04-2022" and term "ton" are flagged for possible misinterpretation.

Figure 8:
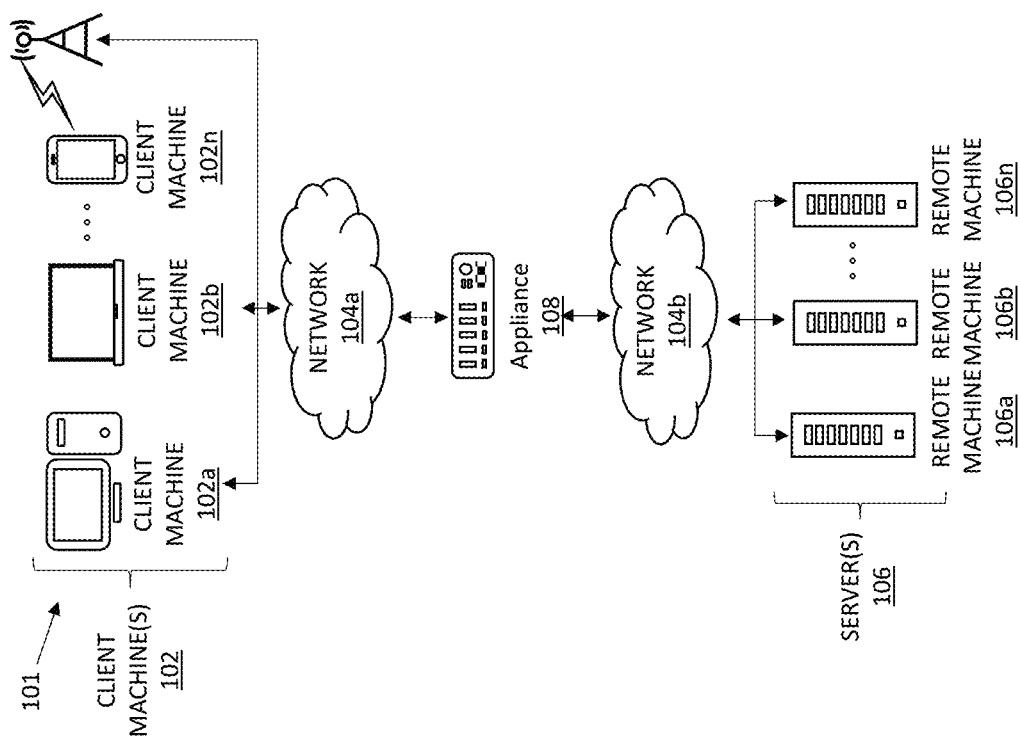
FIG. 8 depicts a network infrastructure, in accordance with an illustrative embodiment.

Referring to FIG. 8, a non-limiting network environment 101 in which various aspects of the disclosure may be implemented includes one or more client machines (or "devices") 102A-102N, one or more remote machines 106A-106N, one or more networks 104, 104', and one or more appliances 108 installed within the computing environment 101. The client machines 102A-102N communicate with the remote machines 106A-106N via the networks 104, 104'.

In some embodiments, the client machines 102A-102N communicate with the remote machines 106A-106N via an intermediary appliance 108. The illustrated appliance 108 is positioned between the networks 104, 104' and may also be referred to as a network interface or gateway. In some embodiments, the appliance 108 may operate as an application delivery controller (ADC) to provide clients with access to business applications and other data deployed in a datacenter, the cloud, or delivered as Software as a Service (SaaS) across a range of client devices, and/or provide other functionality such as load balancing, etc. In some embodiments, multiple appliances 108 may be used, and the appliance(s) 108 may be deployed as part of the network 104 and/or 104'.

The client machines 102A-102N may be generally referred to as client machines 102, local machines 102, clients 102, client nodes 102, client computers 102, client devices 102, computing devices 102, endpoints 102, or endpoint nodes 102. The remote machines 106A-106N may be generally referred to as servers 106 or a server farm 106. In some embodiments, a client device 102 may have the capacity to function as both a client node seeking access to resources provided by a server 106 and as a server 106 providing access to hosted resources for other client devices 102A-102N. The networks 104, 104' may be generally referred to as a network 104. The networks 104 may be configured in any combination of wired and wireless networks.

A server 106 may be any server type such as, for example: a file server; an application server; a web server; a proxy server; an appliance; a network appliance; a gateway; an application gateway; a gateway server; a virtualization server; a deployment server; a Secure Sockets Layer Virtual Private Network (SSL VPN) server; a firewall; a web server; a server executing an active directory; a cloud server; or a server executing an application acceleration program that provides firewall functionality, application functionality, or load balancing functionality.

A server 106 may execute, operate or otherwise provide an application that may be any one of the following: software; a program; executable instructions; a virtual machine; a hypervisor; a web browser; a web-based client; a client-server application; a thin-client computing client; an ActiveX control; a Java applet; software related to voice over internet protocol (VoIP) communications like a soft IP telephone; an application for streaming video and/or audio; an application for facilitating real-time-data communications; a HTTP client; a FTP client; an Oscar client; a Telnet client; or any other set of executable instructions.

In some embodiments, a server 106 may execute a remote presentation services program or other program that uses a thin-client or a remote-display protocol to capture display output generated by an application executing on a server 106 and transmit the application display output to a client device 102.

In yet other embodiments, a server 106 may execute a virtual machine providing, to a user of a client device 102, access to a computing environment. The client device 102 may be a virtual machine. The virtual machine may be managed by, for example, a hypervisor, a virtual machine manager (VMM), or any other hardware virtualization technique within the server 106.

In some embodiments, the network 104 may be: a local-area network (LAN); a metropolitan area network (MAN); a wide area network (WAN); a primary public network 104; and a primary private network 104. Additional embodiments may include a network 104 of mobile telephone networks that use various protocols to communicate among mobile devices. For short range communications within a wireless local-area network (WLAN), the protocols may include 802.11, Bluetooth, and Near Field Communication (NFC).

Figure 9:
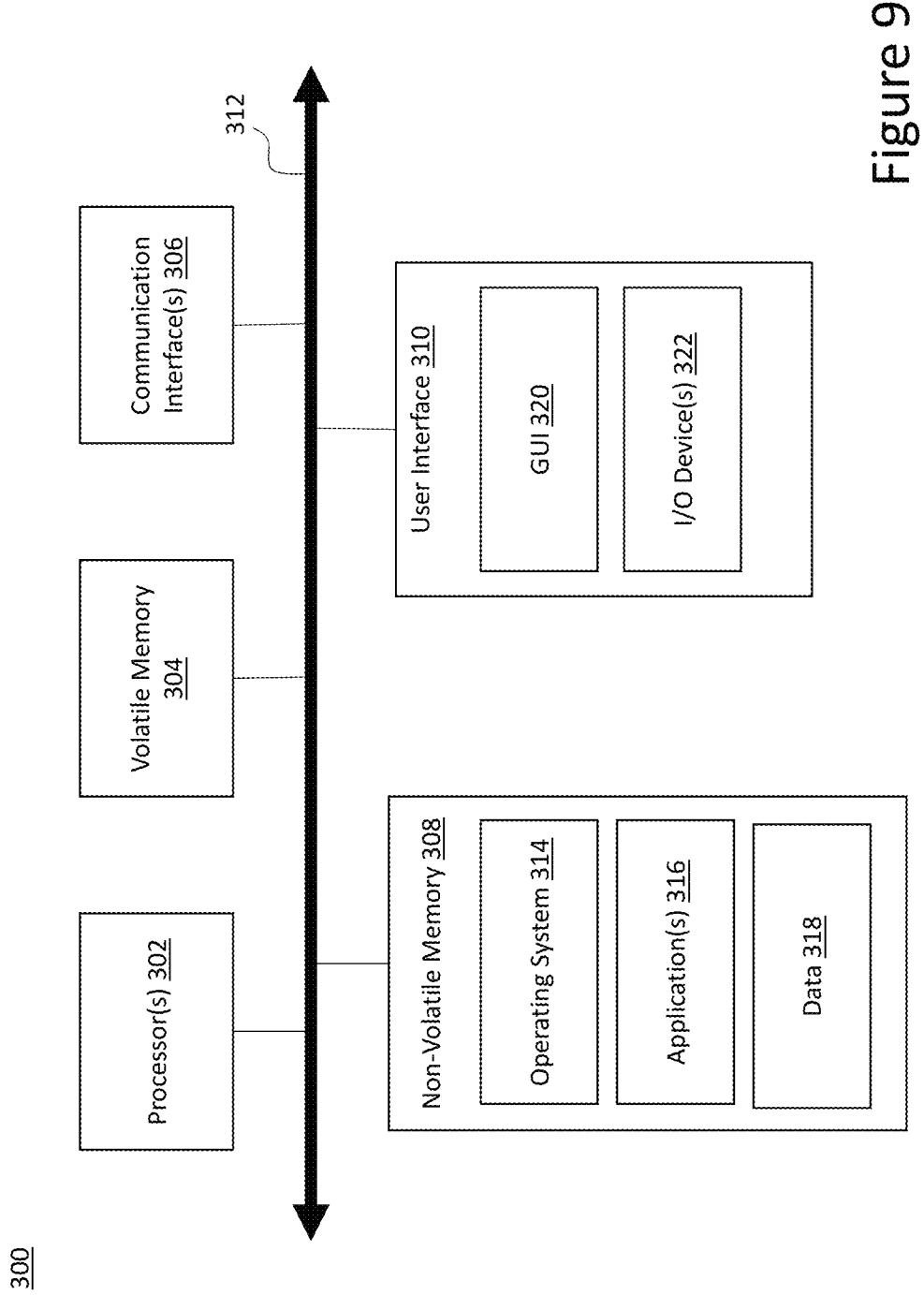
FIG. 9 depicts a computing system, in accordance with an illustrative embodiment.

Elements of the described solution may be embodied in a computing system, such as that shown in FIG. 9 in which a computing device 300 may include one or more processors 302, volatile memory 304 (e.g., RAM), non-volatile memory 308 (e.g., one or more hard disk drives (HDDs) or other magnetic or optical storage media, one or more solid state drives (SSDs) such as a flash drive or other solid state storage media, one or more hybrid magnetic and solid state drives, and/or one or more virtual storage volumes, such as a cloud storage, or a combination of such physical storage volumes and virtual storage volumes or arrays thereof), user interface (UI) 310, one or more communications interfaces 306, and communication bus 312. User interface 310 may include graphical user interface (GUI) 320 (e.g., a touchscreen, a display, etc.) and one or more input/output (I/O) devices 322 (e.g., a mouse, a keyboard, etc.). Non-volatile memory 308 stores operating system 314, one or more applications 316, and data 318 such that, for example, computer instructions of operating system 314 and/or applications 316 are executed by processor(s) 302 out of volatile memory 304. Data may be entered using an input device of GUI 320 or received from I/O device(s) 322. Various elements of computer 300 may communicate via communication bus 312. Computer 300 as shown in FIG. 9 is shown merely as an example, as clients, servers and/or appliances and may be implemented by any computing or processing environment and with any type of machine or set of machines that may have suitable hardware and/or software capable of operating as described herein.

Processor(s) 302 may be implemented by one or more programmable processors executing one or more computer programs to perform the functions of the system. As used herein, the term "processor" describes an electronic circuit that performs a function, an operation, or a sequence of operations. The function, operation, or sequence of operations may be hard coded into the electronic circuit or soft coded by way of instructions held in a memory device. A "processor" may perform the function, operation, or sequence of operations using digital values or using analog signals. In some embodiments, the "processor" can be embodied in one or more application specific integrated circuits (ASICs), microprocessors, digital signal processors, microcontrollers, field programmable gate arrays (FPGAs), programmable logic arrays (PLAs), multi-core processors, or general-purpose computers with associated memory. The "processor" may be analog, digital or mixed-signal. In some embodiments, the "processor" may be one or more physical processors or one or more "virtual" (e.g., remotely located or "cloud") processors.

Communications interfaces 306 may include one or more interfaces to enable computer 300 to access a computer network such as a LAN, a WAN, or the Internet through a variety of wired and/or wireless or cellular connections.

In described embodiments, a first computing device 300 may execute an application on behalf of a user of a client computing device (e.g., a client), may execute a virtual machine, which provides an execution session within which applications execute on behalf of a user or a client computing device (e.g., a client), such as a hosted desktop session, may execute a terminal services session to provide a hosted desktop environment, or may provide access to a computing environment including one or more of: one or more applications, one or more desktop applications, and one or more desktop sessions in which one or more applications may execute.

As will be appreciated by one of skill in the art upon reading the following disclosure, various aspects described herein may be embodied as a system, a device, a method or a computer program product (e.g., a non-transitory computer-readable medium having computer executable instruction for performing the noted operations or steps). Accordingly, those aspects may take the form of an entirely hardware embodiment, an entirely software embodiment, or an embodiment combining software and hardware aspects. Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. "Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately" and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise. "Approximately" as applied to a particular value of a range applies to both values, and unless otherwise dependent on the precision of the instrument measuring the value, may indicate +/−10% of the stated value(s).

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The foregoing drawings show some of the processing associated according to several embodiments of this disclosure. In this regard, each drawing or block within a flow diagram of the drawings represents a process associated with embodiments of the method described. It should also be noted that in some alternative implementations, the acts noted in the drawings or blocks may occur out of the order noted in the figure or, for example, may in fact be executed substantially concurrently or in the reverse order, depending upon the act involved. Also, one of ordinary skill in the art will recognize that additional blocks that describe the processing may be added.

The following paragraphs (S1) through (S9) describe examples of system that may be implemented in accordance with the present disclosure.

(S1) system, comprising: a memory; and a processor coupled to the memory and configured to detect interpretation risks in an email application, including: extracting data from a header of an email, the data indicative of a locale of a sender of the email; comparing the extracted data to other data indicative of a locale of a recipient of the email; and in response to a mismatch between the locales of the sender and recipient: scanning content of the email to identify portions of content that is subject to misinterpretation by the recipient, and modifying display of the email in response to an identification of at least one portion of content subject to misinterpretation, the modifying to indicate possible misinterpretation of the content by the recipient.

(S2) A system may be configured as described in paragraph (S1), wherein the client device includes an email client that obtains the locale of the recipient from the client device.

(S3) A system may be configured as described in any of paragraphs (S1) or (S2), wherein the header is implemented according to ARPA Internet message standard RFC 822.

(S4) A system may be configured as described in any of paragraphs (S1)-(S3), wherein the locales of the sender and recipient include a language code or an area code.

(S5) A system may be configured as described in any of paragraphs (S4), wherein the other data strings are in one of the following formats: date, number, time, and currency.

(S6) A system may be configured as described in paragraph (S1), wherein scanning content includes comparing text strings in the email with a database of words known to be misinterpreted by recipients.

(S7) A system may be configured as described in paragraph (S1)-(S6), wherein the modification of the display of the email includes at least one of: highlighting, colorizing, marking, underlining, and annotating.

(S8) A system may be configured as described in any of paragraphs (S1)-(S7), further comprising a trusted platform module (TPM) chip to prevent tampering.

(S9) A system may be configured as described in any of paragraphs (S1)-(S8), wherein the locale of the sender is inserted into the email by an email client executable on a client device of the sender.

The following paragraphs (M1) through (M8) describe examples of methods that may be implemented in accordance with the present disclosure.

(M1) A computerized method that detects globalization interpretation risks in an email application, the method comprising: extracting data from a header of an email, the data indicative of a locale of a sender; comparing the extracted data to other data indicative of a locale of a recipient of the email; and in response to a mismatch between the locales of the sender and recipient: scanning content of the email to identify portions of content subject to misinterpretation by the recipient, and modifying display of the email in response to an identification of at least one portion of content subject to misinterpretation, the modifying to indicate possible misinterpretation of the content by the recipient.

(M2) A method may be performed as described in paragraph (M1), wherein the client device includes an email client that obtains the recipient locale from the client device.

(M3) A method may be performed as described in paragraph (M1)-(M2), wherein the header is implemented according to ARPA Internet message standard RFC 822.

(M4) A method may be performed as described in any of paragraphs (M1)-(M3), wherein the locales of the sender and recipient include a language code or an area code.

(M5) A method may be performed as described in any of paragraphs (M1)-(M4), wherein scanning content includes comparing data strings within the email with other data strings known to be misinterpreted by recipients.

(M6) A method may be performed as described in paragraph (M5), wherein the other data string being one of the following formats: date, numbering, time, and currency.

(M7) A method may be performed as described in paragraph (M1), wherein scanning content includes comparing text strings in the email with a database of words known to be misinterpreted by recipients.

(M8) A method may be performed as described in any of paragraphs (M1)-(M7), wherein the modification of the display of the email includes at least one of: highlighting, colorizing, marking, underlining, and annotating.

(M9) A method may be performed as described in any of paragraphs (M1)-(M8), wherein the locale of the sender is inserted into the email by an email client executable on a client device of the sender.

The following paragraphs (P1) through (P2) describe examples of computer program products that may be implemented in accordance with the present disclosure.

(P1) A program product stored on a computer readable medium, which when executed by a computer processor on a client device, provides an email client, the computer program product comprising: program code that loads a user locale into the email client from a client device when the email client is launched; program code that inserts the user locale as a sender locale into a header of an email being sent to a recipient; program code that extracts the sender locale from the header in a received email and compares the sender locale with the user locale; and program code that, in response to a mismatch between the sender locale and the user locale, scans content in the email for interpretation risks and displays the received email with a modification in response to a detection of at least one interpretation risk.

(P2) A program product as provided in (P1), wherein scanning content in the received email for interpretation risks include comparing data strings in the email with a database of known interpretation risks.

Having thus described several aspects of at least one embodiment, it is to be appreciated that various alterations, modifications, and improvements will readily occur to those skilled in the art. Such alterations, modifications, and improvements are intended to be part of this disclosure, and are intended to be within the spirit and scope of the disclosure. Accordingly, the foregoing description and drawings are by way of example only.

Various aspects of the present disclosure may be used alone, in combination, or in a variety of arrangements not specifically discussed in the embodiments described in the foregoing and is therefore not limited in this application to the details and arrangement of components set forth in the foregoing description or illustrated in the drawings. For example, aspects described in one embodiment may be combined in any manner with aspects described in other embodiments.

Also, the disclosed aspects may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc. in the claims to modify a claim element does not by itself connote any priority, precedence or order of one claim element over another or the temporal order in which acts of a method are performed, but are used merely as labels to distinguish one claimed element having a certain name from another element having a same name (but for use of the ordinal term) to distinguish the claim elements.

Also, the phraseology and terminology used herein is used for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A system, comprising:
a memory; and
a processor coupled to the memory and configured to run an email client and detect interpretation risks in received emails, including:
extracting data from a header of an email, the data including a locale of a sender of the email, the locale including a predefined identifier that specifies a language and a country/region;
comparing the locale of the sender to a locale of a recipient of the email, wherein the locale of the recipient is obtained by the email client from the memory of the system upon launching of the email client, the locale being set during an initial configuration of the system; and
in response to a mismatch between the locales of the sender and recipient:
scanning content of the email to identify portions of content subject to misinterpretation by the recipient, wherein content subject to misinterpretation includes words that have different meanings at different locations in the world, and
modifying display of the email in response to an identification of at least one portion of content subject to misinterpretation, the modifying to indicate possible misinterpretation of the content by the recipient.

2. The system of claim 1, wherein the header is implemented with a custom "x-" header prefix according to ARPA Internet message standard RFC 822.

3. The system of claim 1, wherein the predefined identifier is implemented by a standard selected from ISO/IEC 15897, LCID, and BCP 47; or is implemented by a Java programming Locale Class.

4. The system of claim 1, wherein content subject to misinterpretation further includes formatted currency information.

5. The system of claim 1, wherein content subject to misinterpretation further includes formatted number information.

6. The system of claim 1, wherein scanning content includes comparing text strings in the email with a database of words known to be misinterpreted by recipients.

7. The system of claim 1, wherein the modification of the display of the email includes at least one of: highlighting, colorizing, marking, underlining, and annotating.

8. The system of claim 1, wherein the locale of the sender is inserted into the email by an email client executable on a client device of the sender.

9. A computerized method that detects globalization interpretation risks in an email client, the method comprising:
extracting data from a header of an email, the data including a locale of a sender, the locale including a predefined identifier that specifies a language and a country/region;
comparing the locale of the sender to a locale of a recipient of the email, wherein the locale of the recipient is obtained by the email client from a memory upon launching of the email client; and
in response to a mismatch between the locales of the sender and recipient:

scanning content of the email to identify portions of content subject to misinterpretation by the recipient due to a cultural language difference, and modifying display of the email in response to an identification of at least one portion of content subject to misinterpretation, the modifying to indicate possible misinterpretation of the content by the recipient.

10. The method of claim 9, wherein the header is implemented with a custom "x-" header prefix according to ARPA Internet message standard RFC 822.

11. The method of claim 9, wherein the predefined identifier is implemented by a standard selected from ISO/IEC 15897, LCID, and BCP 47; or is implemented by a Java programming Locale Class.

12. The method of claim 9, wherein the content subject to misinterpretation by the recipient due to the cultural language difference includes formatted currency information.

13. The method of claim 9, wherein the content subject to misinterpretation by the recipient due to the cultural language difference includes formatted number information.

14. The method of claim 9, wherein content subject to misinterpretation includes words that have different meanings at different locations in the world.

15. The method of claim 9, wherein the modification of the display of the email includes at least one of: highlighting, colorizing, marking, underlining, and annotating.

16. The method of claim 9, wherein the locale of the sender is inserted into the email by an email client executable on a client device of the sender.

17. A program product stored on a computer readable medium, which when executed by a computer processor on a client device, provides an email client, the computer program product comprising:

program code that loads a user locale into the email client from a memory in the client device when the email client is launched, the user locale being set during an initial configuration of the client device and wherein the user locale includes a predefined identifier that specifies a language and a country/region;

program code that inserts the user locale as a sender locale into a header of an email being sent to a recipient;

program code that extracts the sender locale from the header in a received email and compares the sender locale with the user locale; and program code that, in response to a mismatch between the sender locale and the user locale, scans content in the email for interpretation risks and displays the received email with a modification in response to a detection of at least one interpretation risk, wherein the interpretation risk includes formatted currency information.

18. The program product of claim 17, wherein scanning content in the received email for interpretation risks include comparing data strings in the email with a database of words that have different meanings around the world.

* * * * *